(12) United States Patent
Lee et al.

(10) Patent No.: US 6,522,037 B2
(45) Date of Patent: Feb. 18, 2003

(54) FLAT-TYPED VIBRATION MOTOR

(75) Inventors: In Ho Lee, Suwon-Shi (KR); Hak Jin Jung, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/832,732

(22) Filed: Apr. 11, 2001

(65) Prior Publication Data

US 2002/0074877 A1 Jun. 20, 2002

(30) Foreign Application Priority Data

Dec. 19, 2000 (KR) .......................................... 2000-78793

(51) Int. Cl.[7] .............................................. H02K 11/00
(52) U.S. Cl. ...................................... 310/68 R; 310/81
(58) Field of Search ................................. 310/81, 67 R, 310/71, 68 R; 360/99.04, 99.08, 98.07; 29/596–598

(56) References Cited

U.S. PATENT DOCUMENTS 6,274,955 B1 * 8/2001 Satoh et al. .................. 310/71

* cited by examiner

Primary Examiner—Tran Nguyen
(74) Attorney, Agent, or Firm—Darby & Darby

(57) ABSTRACT

The flat-typed vibration motor comprises a lower case; an upper case covering one side of the lower case; a shaft connecting and supporting the lower case and the upper case; a magnet attached to an upper surface of the lower case; an upper board eccentrically and rotatably supported by the shaft and having a commutator formed with a plurality of segments, the commutator formed in a lower surface of the upper board; a plurality of winding coils spaced at a predetermined angle to each other, and an insulator of a typical resin for fixing the winding coils, the winding coils and the insulator being arranged on one surface of the upper board; and a lower board for covering the lower case, the lower board having one end connected to a brush contacted with the commutator and the other end exposed downwardly from the lower case and comprised of a solder land formed in a regular spacing.

4 Claims, 6 Drawing Sheets

FLAT-TYPED VIBRATION MOTOR

BACKGROUND OF THE INVENTION

1. Field of the Invention

The present invention relates to a flat-typed vibration motor capable of receiving a current, with a portion of a lower board having a brush being exposed, thereby increasing its productivity.

2. Description of the Prior Art

Generally, receiving function for receiving a voice or a message is required in communication devices, and in addition, an incoming call notifying function is also required therein. As means for performing the incoming call notifying function, a sounding mode in which a bell or melody is used and a vibration mode which uses a vibration are widely used.

In other words, if a user optionally selects one among incoming notifying functions to employ in notifying of an incoming call, when an incoming call is received, a preset function is started to notify the user of a cellular phone of the incoming call.

Between the incoming call notifying modes, the vibration mode is selected so as not to exert offensive influences on its environment.

In order to notify the user of the incoming call, the sounding mode adopts various kinds of melody or bell inputted to emit the sound by a small sound generation device, while the vibration mode adopts a vibrating force transmitted to a case of the communication device.

The vibrating mode is effected by the vibration motor which is dispersed in the communication device, and a typical example of this vibration motor is a coin-typed or flat-typed vibration motor (so-called pancake motor) including a configuration of a diameter large relative to a thickness thereof, as shown in FIG. 1.

This flat-typed vibration motor comprises a fixing member, i.e., a stator consisting of a magnet 3 and a case, and a rotating member, i.e., a rotor r, and an electrical connection between the stator and the rotor is achieved by a brush 7b.

Specifically, a lower board 2 with a printed circuit on one surface is attached to an upper surface of a lower case 1 of a circular plate by means of an adhesive, and the doughnut-shaped magnet 3 is attached to an upper surface of the lower board 2 by the same way.

At that time, since the lower board 2 is attached to a portion of the upper surface of the lower case 1, the magnet 3 is significantly attached to the lower board 2 of the lower case 1.

On the other hand, an upper portion of the lower case 1 is covered by an upper case 4, of which has a cap-shaped configuration, and is opened at its lower end. The lower case 1 and the upper case 4 are fixedly engaged to each other by means of a shaft 5 passing through a center of the cases.

A conventional hard board is used as the lower board 2 attached to the lower case 1, and a desired circuit pattern is generally formed on the lower board 2.

The pattern on the lower board 2 is connected to a lead wire 2a to be supplied with a power, and the lead wire is connected to an external power apparatus (not shown) by a welding or is connected to a separate connector.

The vibrating motor comprises a stator and a rotor r rotating around the shaft 5.

The rotor includes an upper board 6 defined by cutting a circular flat plate at a predetermined angle to be eccentrically supported by the shaft, and a commutator 7a formed with a plurality of segments and attached to a lower surface of the upper board.

A plurality of winding coils 8a and a weight 8b are bonded to an upper surface of the rotor r, and insulators 9 made of a typical resin are integrally formed with an upper surface of the upper board 6 by an injection molding except for an bonding surface of the winding coils and the weight.

With the vibration motor constructed as mentioned above, electric power, of which is inputted to the lower board 2 through the lead wire 2a is transmitted to the commutator 7a via the brushes 7b.

The brushes 7b are consisting of a power input brush and a power output brush, and they are separated one from another by the same angle. The lower ends of each brushes are fixedly connected to the circuit of the lower board, and the upper end of each brushes are brought into sliding contact with the plurality of segments of the commutator 7a.

Accordingly, the inputted electric power to the commutator 7a is again transmitted to the winding coils 8a via the upper board 6. Then, by the interaction between the winding coils 8a and the magnet 3 which is attached to the lower case, electromagnetic force is generated therebetween to eccentrically rotate the rotor about the shaft. Therefore, the eccentric vibrating force of the rotor is transmitted to the cases through the shaft.

However, in the vibration motor according to the prior art, in order to apply a current to the winding coil 8a provided on the rotor r, one end of the lead wire 2a is connected by welding to the lower board 2, and the other end of the lead wire is connected by welding to a power terminal (not shown) of a unit, onto which the vibration motor is mounted. The welding process may cause the contacted connection to be poor.

In particular, because a worker welds the lead wire 2a by manual, a work efficiency is significantly reduced, and its productivity is also reduced.

Other construction, of which one connector is connected to one end of the lead wire 2a and another connector to be connected to the connector of the lead wire is provided, has been proposed so as to improve the poor contact due to the welding. However, because this method needs several components, a manufacturing cost increases, and the steps for assembling the connectors increases significantly.

SUMMARY OF THE INVENTION

It is, therefore, an object of the present invention to provide a flat-typed vibration motor, in which a portion of a lower board provided on a lower case is exposed to be connected for receiving a current without using a welding process, thereby increasing its productivity To achieve the above object, there is provided a flat-typed vibration motor comprising: a lower case; an upper case covering one side of the lower case; a shaft connecting and supporting the lower case and the upper case; a magnet attached to an upper surface of the lower case; an upper board eccentrically and rotatably supported by the shaft and having a commutator formed with a plurality of segments, the commutator formed in a lower surface of the upper board; a plurality of winding coils spaced at a predetermined angle to each other, and an insulator of a typical resin for fixing the winding coils, the winding coils and the insulator being arranged on one surface of the upper board; and a lower board for covering the lower case, the lower board having one end connected to a brush contacted with the commutator and the other end exposed downwardly from the lower case and comprised of a solder land formed in a regular spacing. Preferably, the lower board is a flexible printed circuit board.

The lower board is electrically connected to a system board including a terminal for applying a power, the terminal having a configuration corresponding to that of the solder land.

The solder land includes a positive pole and a negative pole to receive a power, and is divided into two.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will now be described with reference to the accompanying drawings.

Figure 1:
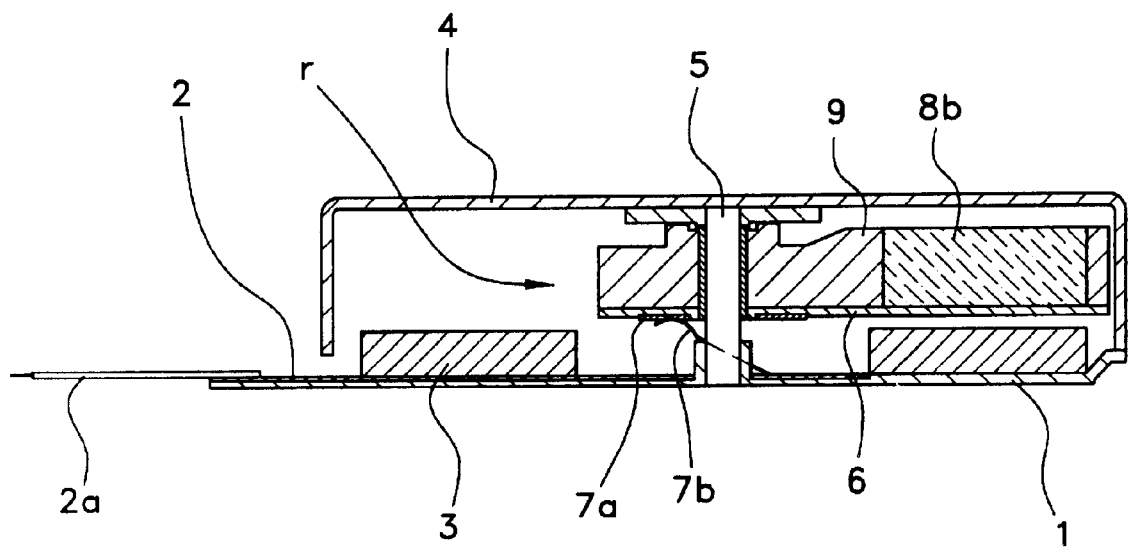
FIG. 1 is a cross sectional view illustrating a construction of a flat-typed vibration motor of a prior art.
Figure 2:
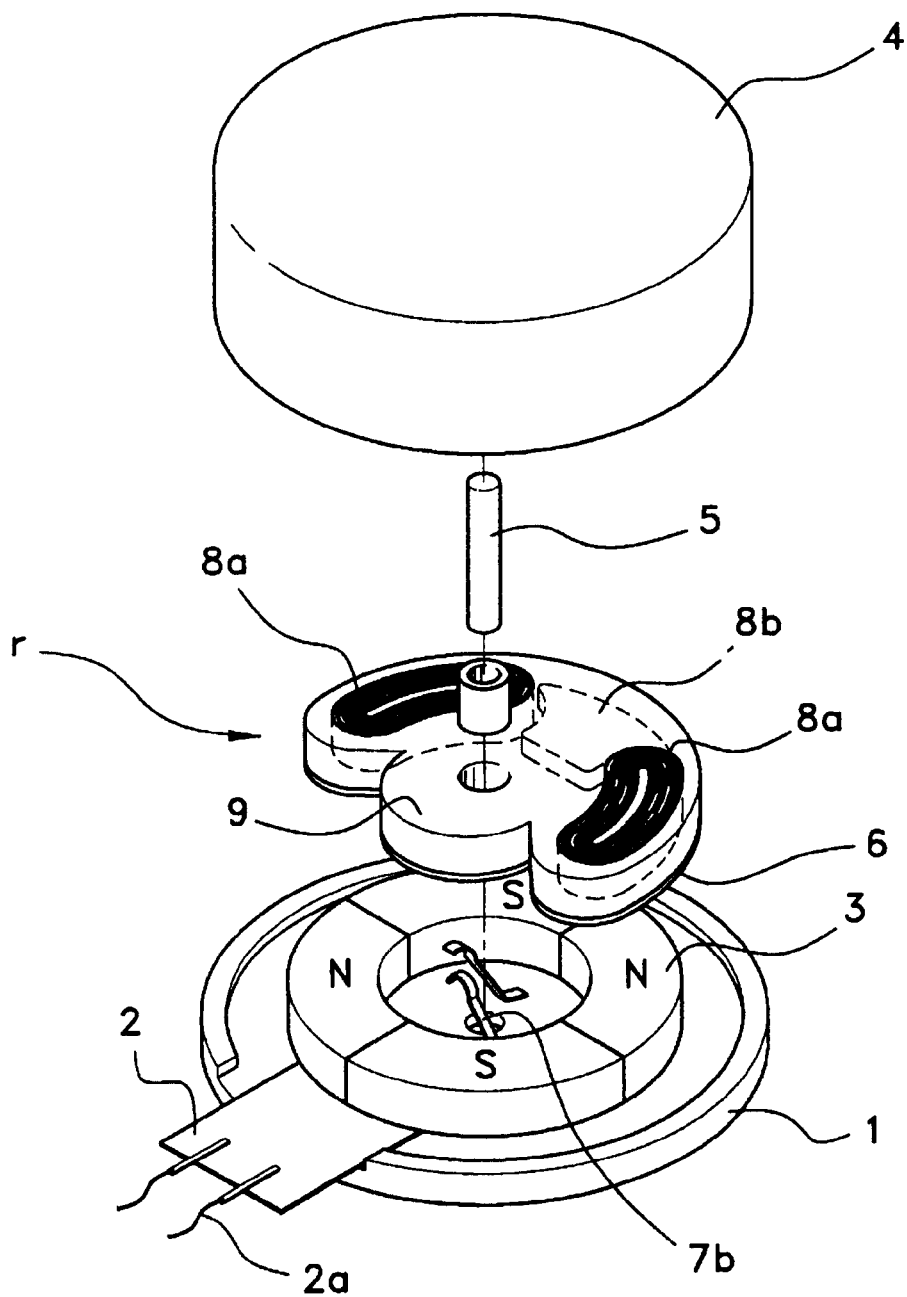
FIG. 2 is an exploded perspective view illustrating a flat-typed vibration motor of a prior art.
Figure 3:
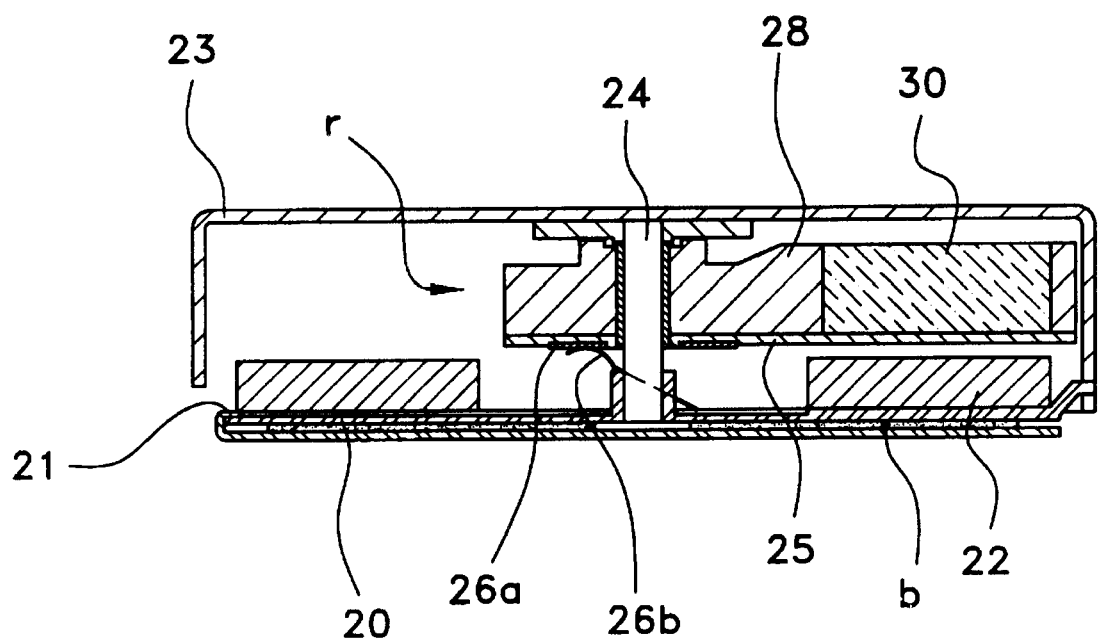
FIG. 3 is a cross sectional view illustrating a construction of a flat-typed vibration motor according to the present invention.
Figure 4:
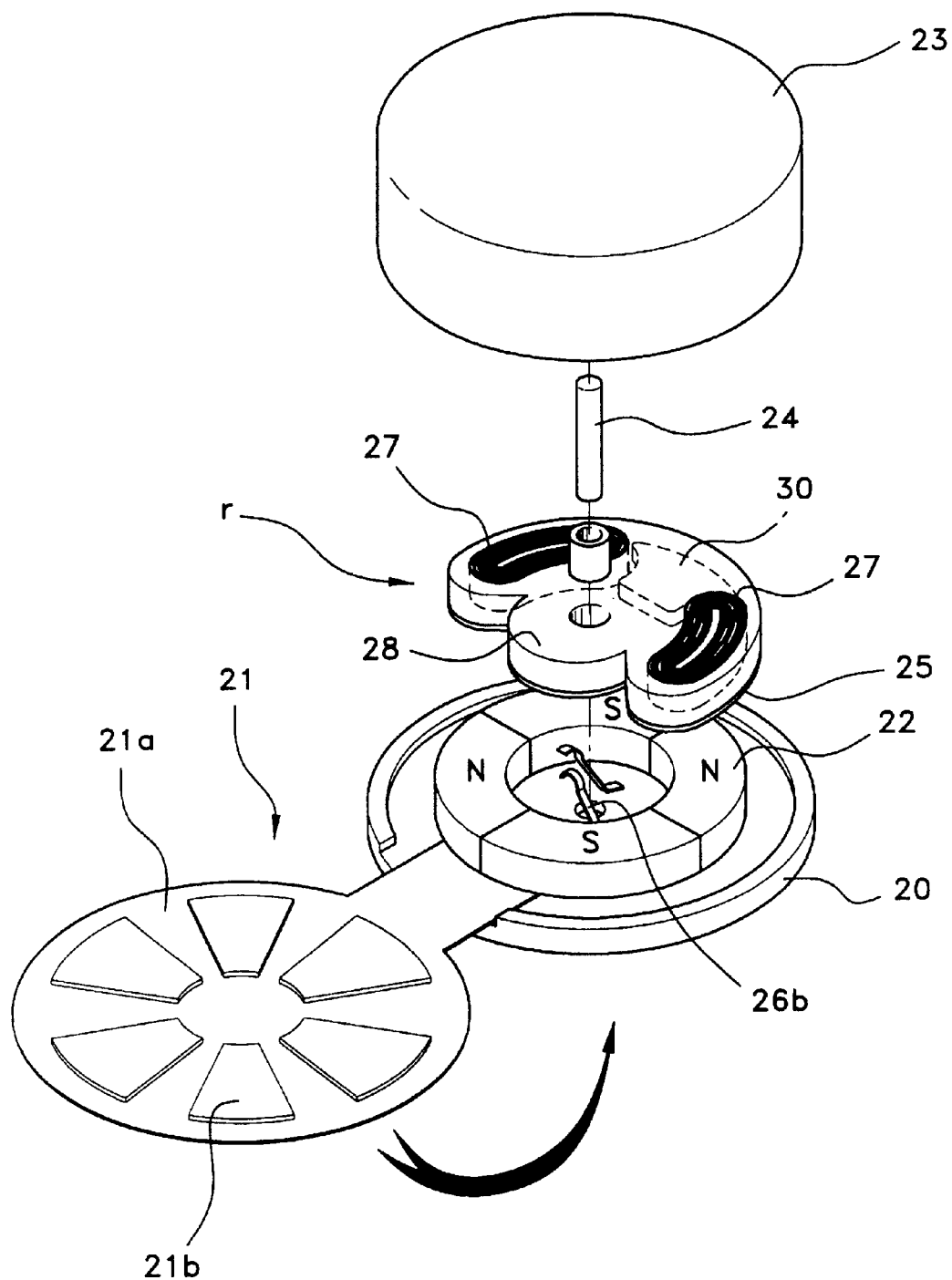
FIG. 4 is an exploded perspective view illustrating a flat-typed vibration motor according to one embodiment of the present invention.
Figure 5:
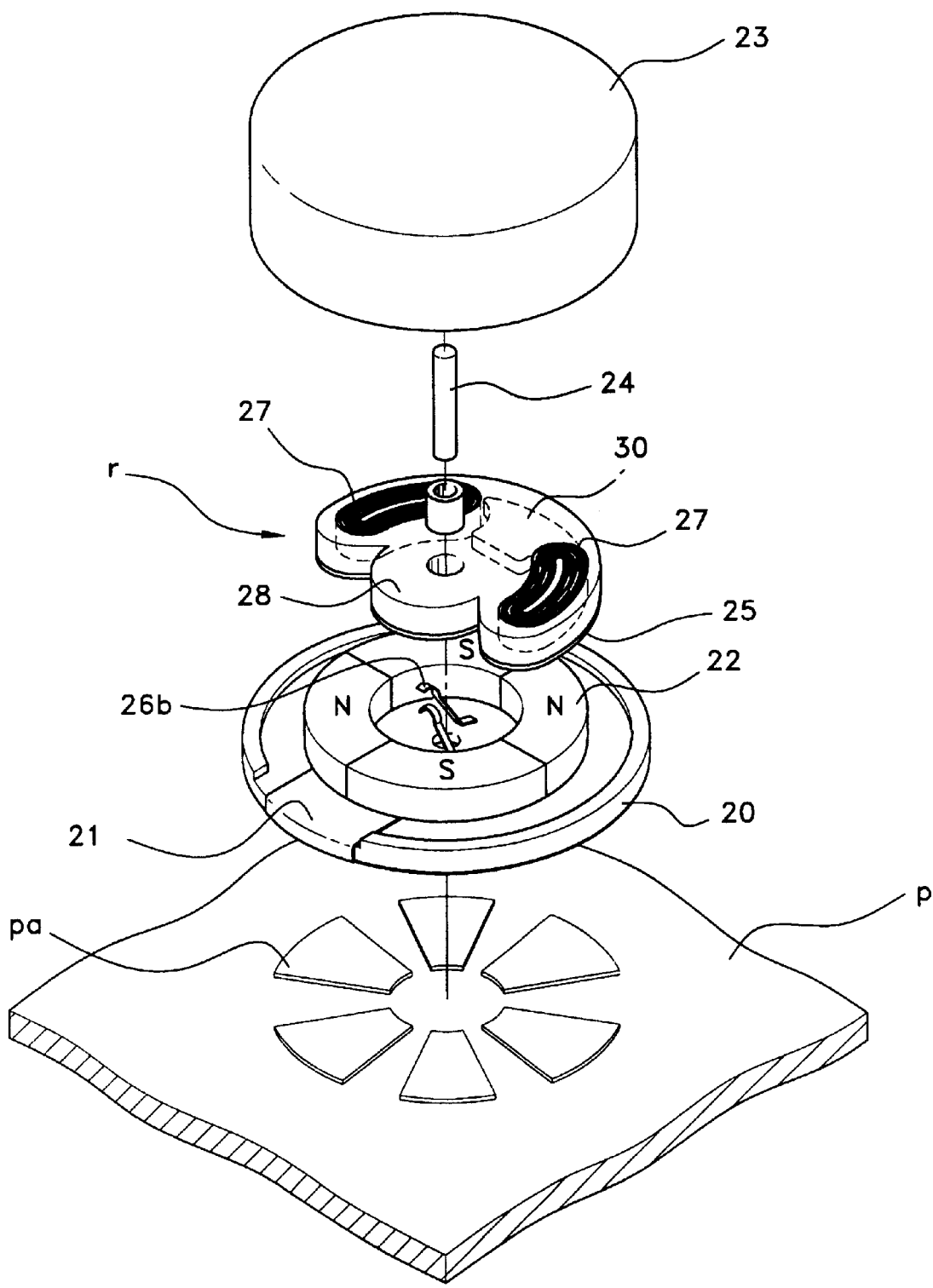
FIG. 5 is an exploded perspective view illustrating a flat-typed vibration motor according to other embodiment of the present invention.

FIGS. 3 to 5 are views illustrating embodiments of the present invention, in which one end of a lower board 21 is outwardly extended to be attached to a bottom of a lower case 20.

A flexible printed circuit board having good elasticity is used as the lower board 21, with one end of the lower board being connected to a portion of an upper surface of the lower case and the other end extending outwardly from a motor and being attached to a bottom of the lower case 20.

A doughnut-shaped magnet 22 is provided on the upper portion of the lower case 20 and the lower board 21.

The lower case 20 is constructed so as to support a shaft 24 on its center, and to protect components provided on the upper portion of the lower case 20 by engaging to an upper case 23.

An upper board 25 is eccentrically and rotatably engaged to the shaft 24, and a winding coil 27 is attached to the upper surface of the upper board 25. The upper board 25 includes a commutator 26a formed with a plurality of segments on a lower surface thereof. The segments of commutators 26a are electrically connected to the lower board 21 by a pair of brushes 26b. In other words, the lower case is sandwiched between the two ends of the lower board.

The rotor r is consisting of the upper board 25 of a printed circuit board, the winding coil 27 formed separately or integrally with the upper board 25 by an insert injection molding, a weight 30, the commutator 26a, and an insulator 28.

The upper board 25 is defined by cutting a circular flat plate at a predetermined angle to be eccentrically supported by the shaft 24. The winding coil 27 is eccentrically arranged on the upper board 25.

The winding coil 27 may be made of a single, two, or three phase according to the driving characteristic of the vibration motor, and is attached to the upper board 25 by an adhesive or the like.

At least one pair of the winding coil 27 is provided, and the winding coils are spaced apart from each other in a regular interval. A space between the winding coils is provided with a weight of high specific gravity, to increase an amount of vibration.

The weight 30 functions as a major effect of determining an eccentric degree of the rotor r. Preferably, the weight is made of tungsten.

According to the present invention, the lower board 21 is made of a flexible printed circuit board, of which one end of the lower board is engaged to the upper surface of the lower case 20 to be connected to the brush 26b as shown in FIG. 4, and the other end is bent and is attached to the bottom of the lower case 20 as shown in FIG. 3 or 5.

In particular, the exposed surface of the lower board, i.e., a terminal plate 21a attached to the bottom of the lower case 20 is provided with solder lands 21b in a regular spacing.

The terminal plate 21 of the lower board 21 may be attached to the bottom of the lower case 20 by an adhesive tape or the like.

The solder lands 21b formed on the terminal plate 21a serve as a kind of power terminal so as to receive a power from the exterior, and is applied with a predetermined amount of lead.

The solder lands 21b are arranged in a constant spacing as shown in FIG. 4, and are constructed of a positive pole and a negative pole to be supplied with the power, with the solder lands being divided into at least two.

Specifically, the solder lands are divided into six in a constant spacing as shown in FIG. 4, and at least one pair of solder land 21b is electrically connected to each other to supply the power to the brush 26b.

Figure 6:
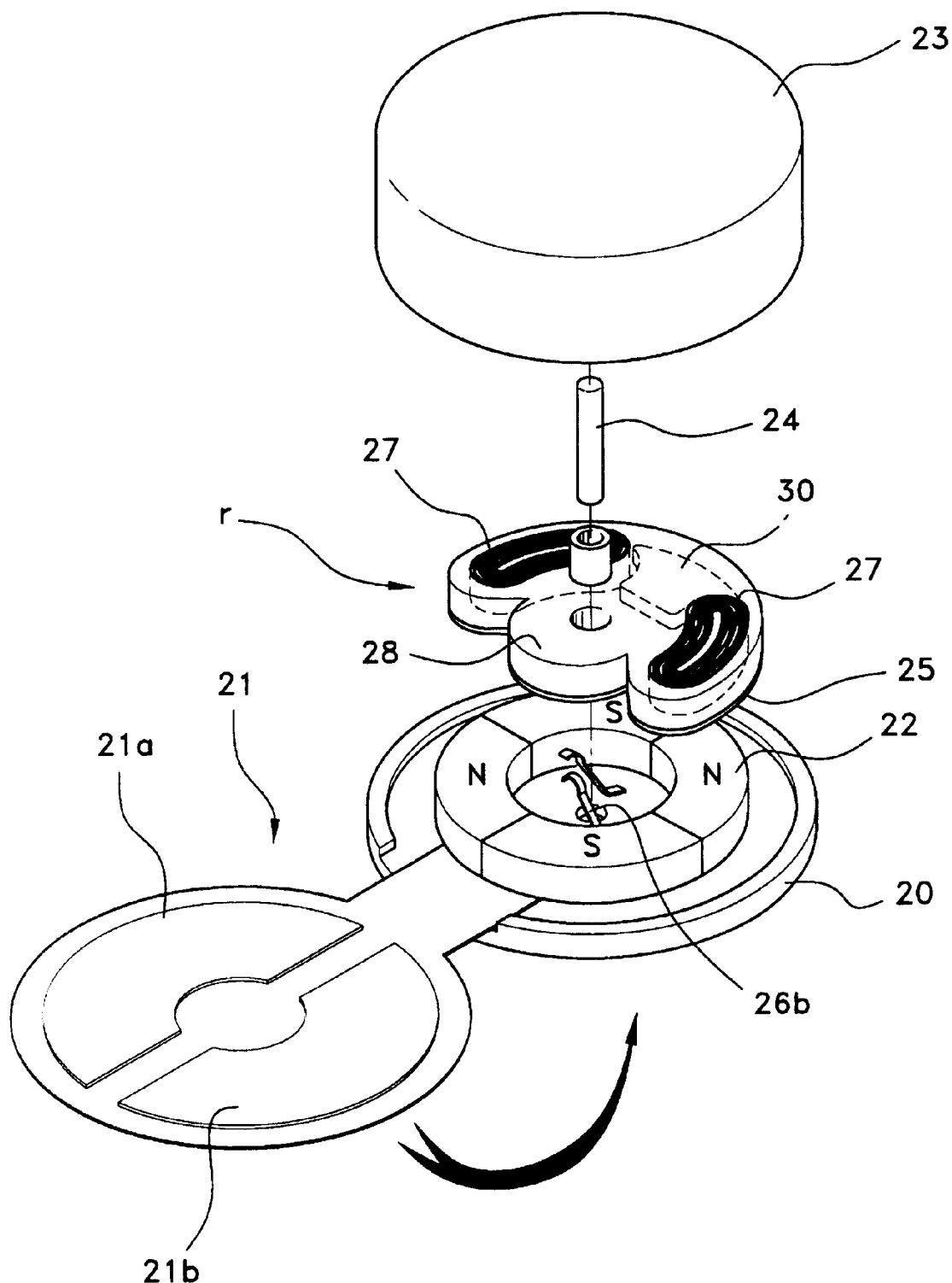
FIG. 6 is an exploded perspective view illustrating a flat-typed vibration motor according to another embodiment of the present invention.

Although it is not limited to the number of the solder lands 21b, it is necessary for the solder lands to need at least two contacting points so as to receive the power as shown in FIG. 6.

If the solder lands 21b are constructed so as to receive the power, the configuration and the position of the solder land 21b can be altered.

In the flat-shaped vibration motor according to the embodiment of the present invention, in case of mounting the vibration motor of the present invention onto a mobile communication device, as shown in FIG. 5, the lower board 21 is electrically connected to a printed circuit board p of the communication device.

The printed circuit board p of the communication device is connected to the lower board 21 so as to supply the power, and includes a connecting terminal pa corresponding to the solder land 21b.

Specifically, the printed circuit board p of the communication device includes a connecting terminal pa having configuration and arrangement corresponding to the solder land 21b formed on the terminal plate 21a, thereby applying the power to the lower board 21 through the solder land 21b.

In particular, the lower board 21 with 6 solder lands 21b formed as shown in FIG. 4 is connected to the printed circuit board p with the connecting terminals pa having a same configuration and arrangement as those of the solder lands 21b formed.

The construction for applying the power of the flat-typed vibration motor according to the present invention will now be described.

First of all, the apparatus for mounting the flat-typed vibration motor will be described by way of example of the mobile communication device, with reference to FIGS. 4 and 5.

The mobile communication device is constructed so as to receive the power from a battery, and includes the printed circuit board p onto which several components such as a transmitter and a receiver are mounted.

The printed circuit board p is provided with a number of connecting terminals pa in a constant interval as shown in FIG. 5.

The flat-typed vibration motor according to the present invention may be electrically to the printed circuit board p of the mobile communication device as described above.

The flat-typed vibration motor, of which the assembled state of the motor is shown in FIG. 3, is positioned on the upper portion of the printed circuit board p as shown in FIG. 5.

The solder lands 21b formed on the lower board 21 of the flat-typed vibration motor and the connecting terminal pa formed on the printed circuit board p are positioned so as to be opposite to each other.

If the solder land 21b of the lower board 21 is connected to the connecting terminal pa of the printed circuit board p, the lower board 21 is electrically connected to the printed circuit board p to receive the power.

If the contacting portion of the lower board 21 and the printed circuit board p, i.e., the connecting terminal pa and the solder land 21b, is applied with a heat, the lead applied on the solder land or the connecting terminal is melted. And then, if the flat-typed vibration motor is pressed against the printed circuit board p, the solder land 21b of the lower board 21 is engaged to the contacting terminal pa of the printed circuit board p by the hardening of the lead.

Accordingly, the flat-typed vibration motor having the construction as described above can be supplied with the power from the power supplying apparatus.

The current applied through the lower board 21 is transmitted to the commutator 26a through the brush 26b, and also is transmitted to the winding coil 27 through the upper board 25. Therefore, the winding coil 27 is supplied with the current from both the upper board 25 and the commutator 26a, so that the winding coil 27 is always maintained in a turned-on state.

An electromagnetic force is generated by reaction of the winding coil 27 and the magnet 22 provided under the winding coil, so that the rotor r eccentrically supported by the shaft 24 is driven by the electromagnetic force. This eccentric driving force is transmitted to the case, thereby vibrating the device.

Since the flat-typed vibration motor according to the present invention does not need a lead wire for receiving the power as the prior art, the welding process for welding the lead wire is not necessary. Therefore, the workability and productivity thereof increase.

Specifically, the solder land 21b formed on the terminal plate of the lower board is seated on the printed circuit board p, and the print circuit board and the lower board are connected only by applying a heat to the contacting point. Therefore, the connection may be automatically achieved, thereby guaranteeing the uniform quality of the device and improving the productivity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A flat-typed vibration motor comprising:
   a lower case formed from a magnetic material;
   an upper case covering one side of the lower case;
   a shaft connecting and supporting the lower case and the upper case;
   a magnet attached to an upper surface of the lower case;
   an upper board eccentrically and rotatably supported by the shaft and having a commutator formed with a plurality of segments, the commutator formed in a lower surface of the upper board;
   a plurality of winding coils spaced at a predetermined angle to each other, and an insulator of resin for fixing the winding coils, the winding coils and the insulator being arranged on one surface of the upper board;
   a lower board for covering the lower case, the lower board having one end connected to a brush in contact with the commutator and the other end exposed downwardly from the lower case and comprised of spaced solder lands; and
   wherein the lower board is a flexible printed circuit board.

2. The flat-typed vibration motor as claimed in claim 1, wherein the lower board is electrically connected to a system board including terminals for applying power, the terminals being spatially aligned with the solder lands.

3. The flat-typed vibration motor as claimed in claim 1, wherein the solder lands include a positive pole and a negative pole to receive power.

4. The vibration motor of claim 1 wherein the lower board is folded around the lower case so that the one and other ends have the lower case sandwiched between them.

* * * * *